April 29, 1924.
S. G. GOTIS
CORN POPPER
Filed Oct. 29, 1923
1,492,448
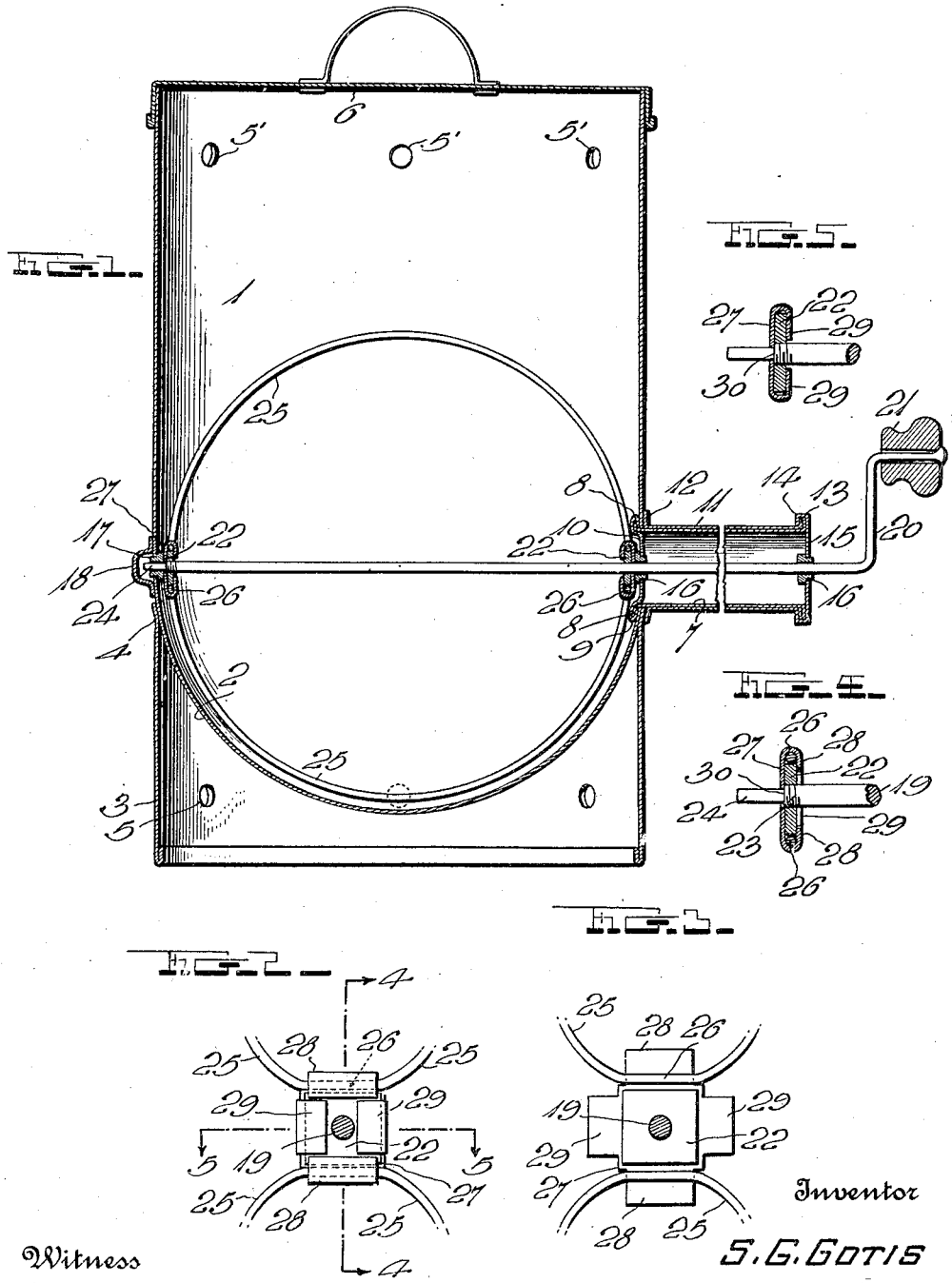
Witness
H. Woodard
Inventor
S. G. GOTIS
By H. B. Wilson & Co.
Attorneys Patented Apr. 29, 1924.

1,492,448

UNITED STATES PATENT OFFICE.

STRATIS G. GOTIS, OF WATERLOO, IOWA.

CORN POPPER.

Application filed October 29, 1923. Serial No. 671,575.

*To all whom it may concern:*

Be it known that I, STRATIS G. GOTIS, a citizen of Turkey, residing at Waterloo, in the county of Black Hawk and State of Iowa, have invented certain new and useful Improvements in Corn Poppers; and I do declare the following to be a full, clear, and exact description of the invention, such as will enable others skilled in the art to which it appertains to make and use the same.

My invention aims to provide an improved corn popper in which there is no danger of burning the corn or losing any of the salt, butter, or other flavorings used.

Other objects are to provide a device which may be easily cleaned; to construct an improved form of corn stirrer or agitator; and to provide a unique handle structure for the container in which the corn is popped.

With the foregoing in view, the invention resides in the novel subject matter hereinafter described and claimed, the description being supplemented by the accompanying drawing.

Figure 1 is a vertical sectional view of a corn popper constructed in accordance with my invention.

Figure 2 is a fragmentary end elevation partly in section, showing more particularly the construction of the corn stirrer or agitator.

Figure 3 is a view similar to Fig. 2 but showing the structure before it is completely assembled.

Figures 4 and 5 are detail sectional views on lines 4—4 and 5—5 of Fig. 2.

In the drawing above briefly described, the numeral 1 designates an upright sheet metal container of cylindrical form, said container having an integral, depressed, hemi-spherical bottom 2 which smoothly joins the container wall so that no seams exist to interfere with properly cleaning the device. An annular supporting wall 3 surrounds the depressed bottom 2 and has its upper edge secured thereto as indicated at 4, said wall 3 being extended a sufficient distance below the bottom, to rest upon a stove and support the entire device. The lower portion of the wall 3 is preferably formed with a number of air openings 5 and the upper end of the container 1 is similarly formed with openings 5'. Also, a suitable removable cover 6 is preferably provided for the container.

In providing a handle for the container 1, I preferably employ the construction shown. One side of this container is formed with a circular opening and an inner handle sleeve 7 is passed outwardly therethrough, the inner end of said sleeve having an outwardly bent flange 8 around which the edge 9 of an inner bearing plate 10 is crimped to secure said bearing plate in place and to contact with the inner side of the container wall. An outer handle sleeve 11 surrounds the sleeve 7 and has its inner end formed with an outstanding flange 12 which contacts with the outer side of the container. The outer ends of the two sleeves 7 and 11 are bent outwardly to jointly provide flanges 13 around which the edge 14 of an outer bearing plate 15, is crimped. Solder may be used wherever desired, and is preferably, in all instances, used to secure the parts 8 and 12 to the container wall. By providing a handle constructed in this manner, it is simple and inexpensive, yet will be sufficiently rigid and will have a firm connection with the container.

The bearing plates 10 and 15 are provided with alined bearings 16 which aline with another bearing 17 at a diametrically opposite point of the container wall, the last named bearing being preferably covered by a suitable cap 18 soldered or otherwise secured to said wall. The three bearings support an agitator shaft 19 whose outer end is formed with a suitable operating crank 20 having a finger-piece 21, and upon this shaft, I detachably mount a suitable agitator which operates over the depressed container bottom 2.

The numerals 22 designate a pair of flat rectangular hubs having openings through which the shaft 19 passes, one of these hubs being located adjacent the bearing 16 and having only a sliding fit upon the shaft, while the other hub is disposed adjacent the bearing 17, and is threaded upon the shaft as indicated at 23, the portion of the shaft beyond the threads 23, being preferably reduced as indicated at 24, for reception in the bearing 17. Curved agitating wires 25 having lateral terminals 26, extend from one hub 22 to the other, and said lateral terminals contact with opposed edges of said hubs as seen in Figs. 2, 3 and 4. Thin sheet metal plates 27 contact with the outer sides of the hubs 22 and have openings through which the shaft 19 passes, opposed edges of said plates 27, being provided with tongues 28 which are bent around the wire terminals 26 and clinched onto the inner sides of the hubs. The plates 27 are also provided with additional tongues 29 which are clinched around the remaining edges of the hubs 22. Thus, the agitating wires 25 are effectively secured to the hubs and the latter are held in proper place, even when the shaft 19 is removed, permitting removal of the entire agitator for cleaning purposes. It will be seen that in order to remove the shaft, it is simply necessary to hold the agitator with one hand and rotate said shaft with the other hand, in a direction to disengage the threads 23 from the hub 22 with which they are normally engaged. Then, the entire shaft 19 can be pulled out of the device and the agitator lifted therefrom. To limit the threading of the shaft 19 into the threaded hub, the shoulder 30 formed at the inner end of the reduction 24, may well abut the inner side of the adjacent plate 27, as shown in Figs. 4 and 5.

To operate the device, the corn to be popped and the seasonings are placed in the container and the cover 6 is applied. Then, the device is set upon a stove and the handle 20—21 is operated to effectively stir the corn and prevent possible burning, as well as thoroughly mixing the seasonings therewith. An unusually small amount of heat is necessary to effectively pop the corn with the device, the latter being therefore extremely economical as well as easy to operate and generally desirable. Attention is directed to the fact that since the bottom 2 is solid, none of the seasonings can be lost and the fire cannot come into direct contact with the corn, to burn the same.

After using the device, it may be readily disassembled and easily cleaned, to keep it in a sanitary condition.

As excellent results may be obtained from the details disclosed, they are preferably followed, but within the scope of the invention as claimed, numerous minor changes may be made.

I claim:

1. A device of the class described comprising a hub provided with straight peripheral edges and having an opening through which a shaft may extend, agitating wires having straight ends contacting with certain of said straight peripheral edges of said hub, and a plate having a shaft-receiving opening, said plate contacting with one side of said hub and having tongues bent laterally around said straight wire ends and hub and clinched against the other side of said hub to secure the wires and bind said plate against said hub.

2. A device of the class described comprising a square flat-sided hub provided with an opening through which a shaft may extend, agitating wires having straight ends contacting with two opposed edges of said hub, a plate contacting with one flat side of the hub and having four tongues at the peripheral edges of said hub, two opposite tongues being bent over the straight end of said agitating wires and clinched against the other flat side of the hub to secure the wires and hub together, the other tongues being bent around the other two opposite edges of the hub and clinched against said other flat side of said hub between said first named tongues to hold the hub and plate against relative shifting, parallel with said first named opposed edges.

3. A device of the class described comprising a container having an opening, an inner handle sleeve passing outwardly through said opening and having a flange at its inner end, an inner bearing plate having its edge bent around said flange and disposed in contact with the container, an outer sleeve around said inner sleeve having a flange at its inner end abutting the container, the outer ends of the two sleeves being jointly turned outwardly to provide additional flanges, and an outer bearing plate having its edge turned around said additional flanges.

In testimony whereof I have hereunto affixed my signature.

STRATIS G. GOTIS.